United States Patent [19]
Audenard et al.

[11] 3,863,162
[45] Jan. 28, 1975

[54] HIGH-SPEED DEMODULATOR FOR SINE-WAVE SIGNALS

[75] Inventors: Bernard Audenard, Seclin; Michel Pigeon, Bures Sur Yvette; Claude Stach, Faches-Thumesnil, all of France

[73] Assignee: Commissariat a L'Energie Atomique, Paris, France

[22] Filed: Sept. 7, 1973

[21] Appl. No.: 394,981

[30] Foreign Application Priority Data
Sept. 21, 1972 France ............................ 72.33493

[52] U.S. Cl. ............................... 328/151, 329/145
[51] Int. Cl. .............................................. H03k 5/01
[58] Field of Search ....... 328/26, 151; 329/145, 207

[56] References Cited
UNITED STATES PATENTS
3,207,998  9/1965  Corney et al. ................... 328/151 X
3,504,289  3/1970  Pfeiffer et al. ................... 328/151 X
3,717,818  2/1973  Herbst ............................ 328/151 X

FOREIGN PATENTS OR APPLICATIONS
2,036,239  2/1971  Germany ............................ 328/151

*Primary Examiner*—Alfred L. Brody
*Attorney, Agent, or Firm*—Cameron, Kerkam, Sutton, Stowell & Stowell

[57] ABSTRACT

A sine-wave signal demodulator comprising a first circuit for generating a first drive signal in the form of square-topped pulses each coinciding with the first half of a positive half-wave of said sine-wave signal in each alternate cycle, a first storage sampler which receives said sine-wave signal and is activated by said first drive signal, a second circuit for generating a second drive signal outside the square-topped pulses of said first drive signal, a second storage sampler connected to the output of the first sampler and activated by said second drive signal.

6 Claims, 7 Drawing Figures

Patented Jan. 28, 1975  3,863,162
6 Sheets-Sheet 1
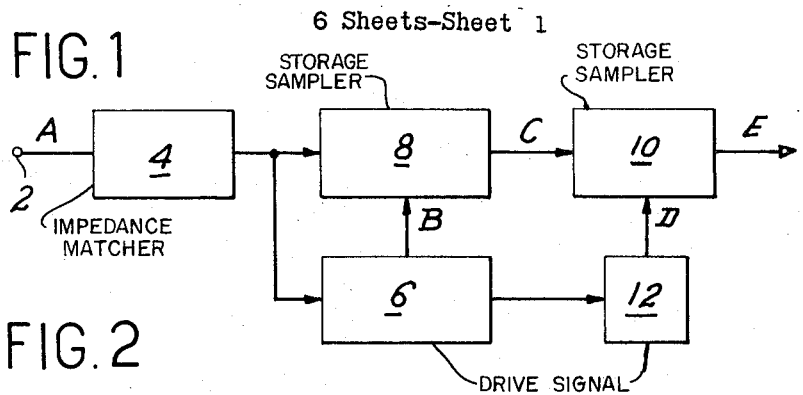
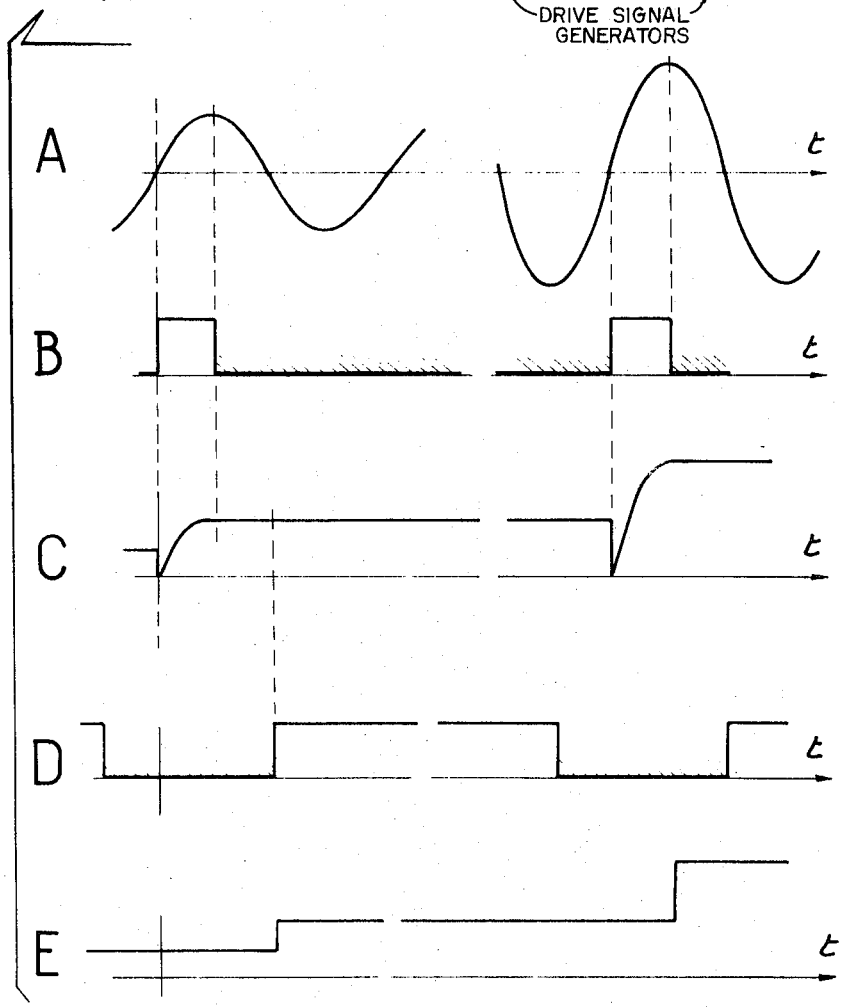

HIGH-SPEED DEMODULATOR FOR SINE-WAVE SIGNALS

This invention relates to a high-speed demodulator for sine-wave signals. The object of this circuit is to generate an analog signal whose amplitude is proportional to the modulus of a sine-wave signal.

There are in existence many different types of circuits which serve to measure the modulus of a sine-wave signal, either by means of operational amplifiers mounted as peak detectors or by means of diode-capacitor systems. The disadvantage of these circuits lies in the fact that they introduce an integration time constant which limits the pass-band of the system.

The precise aim of this invention is to provide a circuit for demodulating sine-wave signals which has a very short response time. This short time interval is obtained by making use of a storage sampler which is activated during one-quarter of a cycle of the sine-wave signal to be scanned, closing of said sampler being intended to correspond to transition of the sine wave to a positive maximum. A second sampler performs a storage operation during the cut-off period of the first sampler. The demodulator thus gives the desired modulus with a time-delay which does not exceed two cycles of the sine-wave signal.

More precisely, this invention is directed to a sine-wave signal demodulator comprising:

a first circuit for generating a first drive signal in the form of square-topped pulses each coinciding with the first half of a positive half-wave of said sine-wave signal in each alternate cycle, a first storage sampler which receives said sine-wave signal and is activated by said first drive signal, a second circuit for generating a second drive signal outside the square-topped pulses of said first drive signal, a second storage sampler connected to the output of the first sampler and activated by said second drive signal.

In a preferred alternative form of construction of the demodulator according to the invention, said first signal-generating circuit is constituted by:

a shaping circuit which receives the sine-wave signal and delivers a signal F formed of rectangular pulses having the same frequency as the sine-wave signal, a sweep waveform generator which is activated by the signal F and emits a signal G, a scale-of-two circuit for dividing the frequency of the signal F by two and delivering a signal H as well as its complement $\bar{H}$, a first logic circuit which performs the operation F.H, a storage sampler which receives the signal resulting from the operation F.H, is activated by the signal G and emits a signal J, a first potentiometer of ratio k which converts G to G' = kG, a second potentiometer of ratio k/2 which converts J to J' = kJ/2, a two-input comparator circuit which receives the signal G' at its negative input and the signal J' at its positive input and which delivers a signal K, a second logic circuit which performs the operation F.$\bar{H}$.K, thus generating said first drive signal.

The second circuit for producing said second drive signal is constituted by a circuit constructed in accordance with one of several designs, namely an inverter to which the first drive signal is applied and which generates the complementary signal, or else a lead which collects the F.H signal from said first signal-generating circuit or finally a logic circuit to which the signals F and $\bar{H}$ are applied and which performs the operation F.$\bar{H}$.

The characteristic features and advantages of the demodulator according to the invention will become more readily apparent from the following description of exemplified embodiments which are given by way of explanation without any implied limitation, reference being made to the accompanying drawings, wherein:

FIG. 1 is a block diagram of the demodulator;

FIg. 2 is a chronogram of the different electrical signals which appear in the circuit of FIG. 1;

Figure 3:
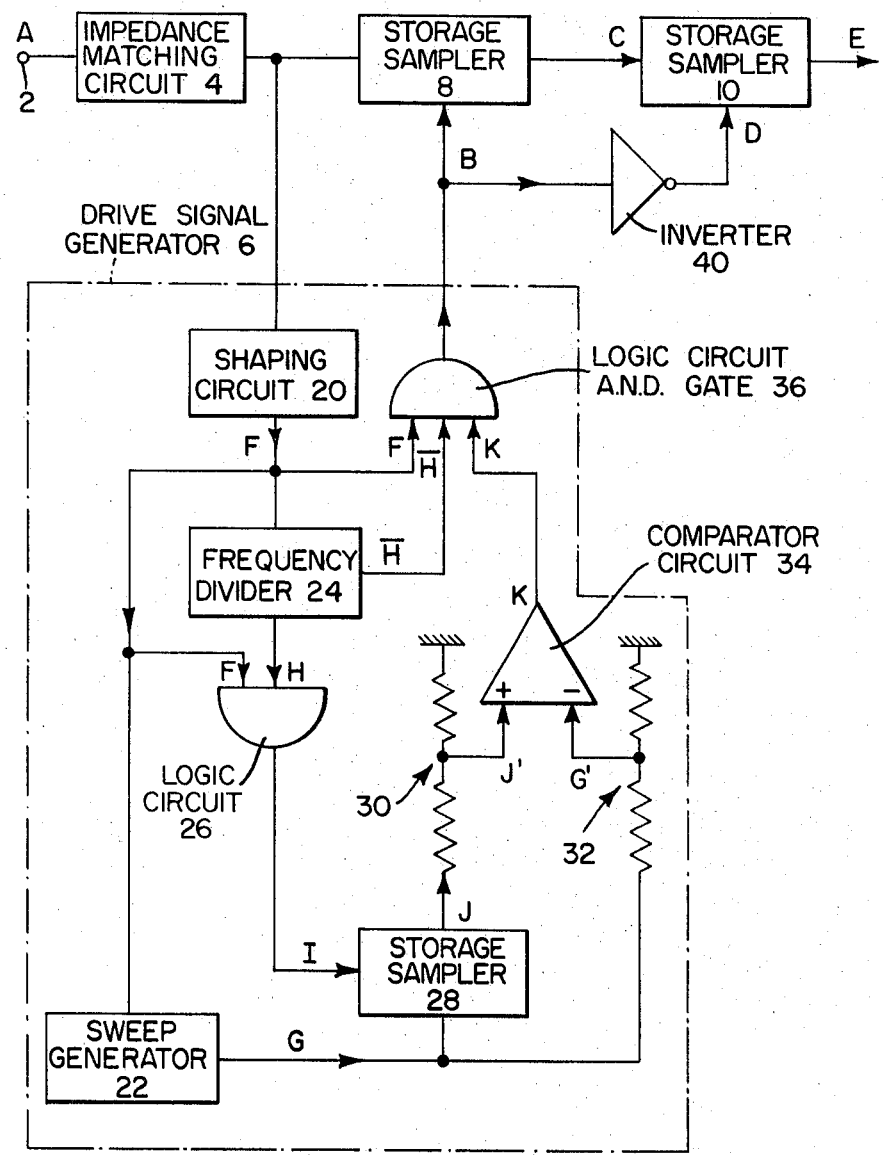
FIG. 3 is a diagram of the first circuit which serves to generate the drive signal for activating the first sampler and which also comprises a second circuit which generates the drive signal for activating the second sampler.
Figure 3A:
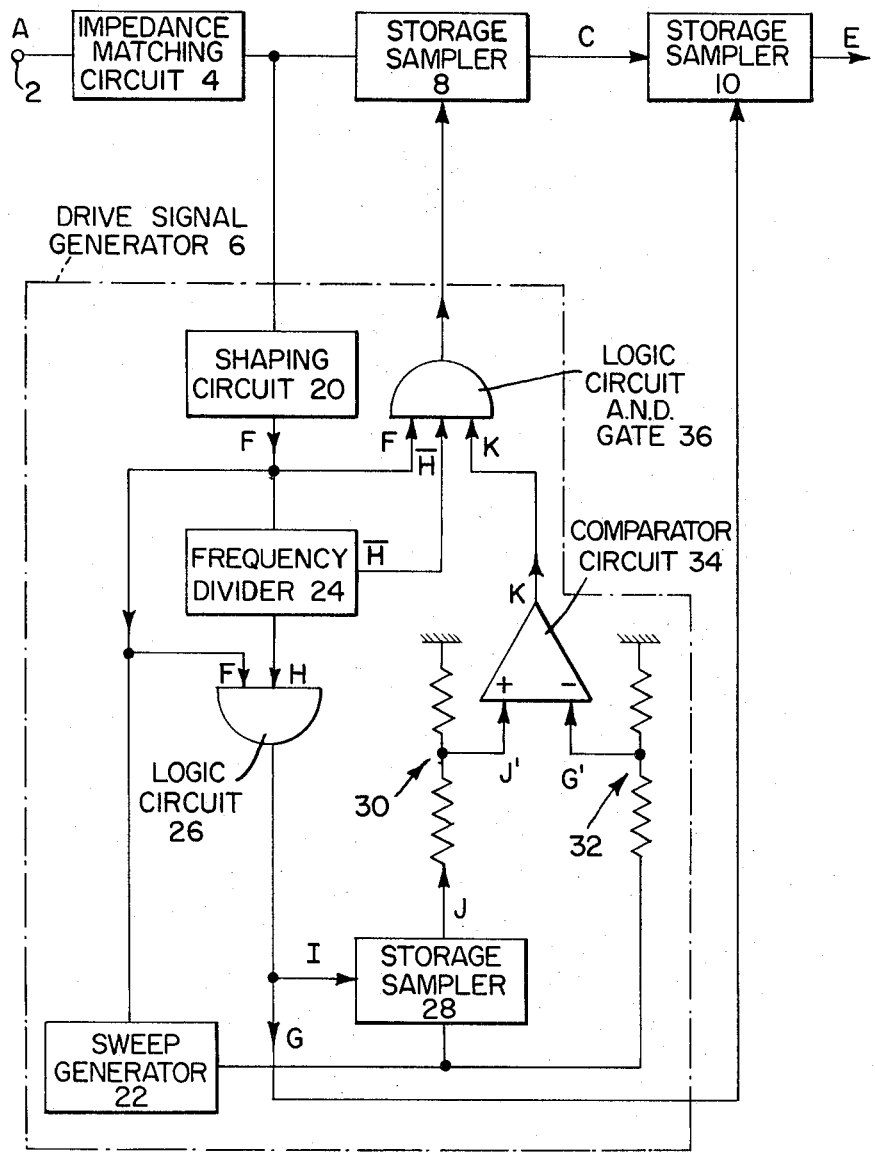
FIg. 3a is a circuit diagram similar to that of FIG. 3 in which the drive signal for the second sampler is generated by a logic circuit.
Figure 3B:
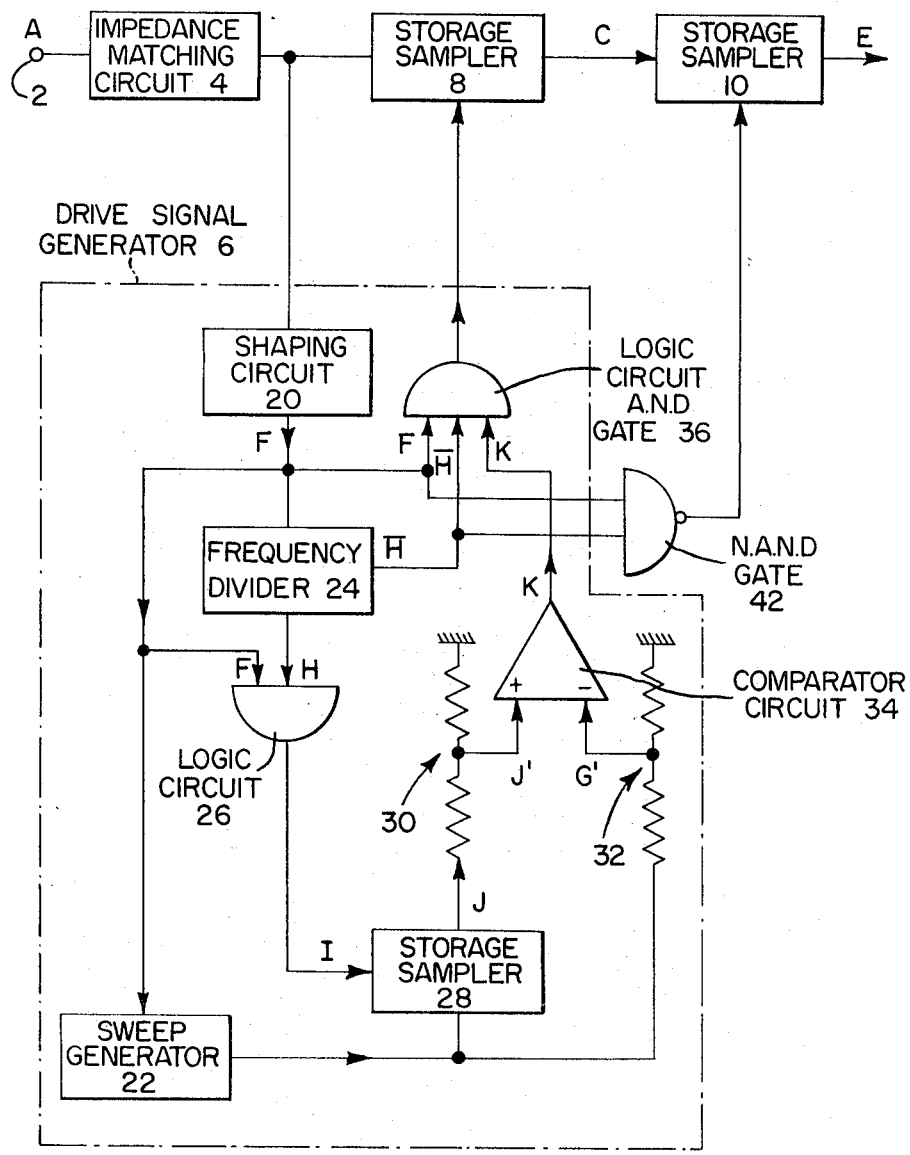
FIG. 3b is a circuit diagram similar to that of FIG. 3 in which the drive signal for the second sampler is generated by a NAND gate.

In the block diagram of FIG. 1 which shows the demodulator in accordance with the invention, the sine-wave signal A to be demodulated is applied to the input 2 and this latter is coupled to an impedance matching circuit 4, the output of which is connected on the one hand to a first circuit 6 for generating a first drive signal B and on the other hand to a storage sampler 8; the sampler 8 which is activated by the signal B delivers at its output a signal C which is sampled and stored by a second storage sampler 10, said second sampler being activated by a signal D derived from a second drive-signal generating circuit 12; at the output of the second sampler 10, there appears an analog signal E, the amplitude of which is proportional to the modulus of the sine-wave signal A.

The chronogram of the different electrical signals which appear at various points of said circuit is shown in FIG. 2. By way of explanation, the sine-wave input signal A has two different amplitudes in the right-hand and left-hand portions of FIG. 2; the drive signal B of the storage sampler 8 is shown on the second line: this is a signal in the form of square-topped pulses, the width of which is equal to one-quarter of the cycle of the signal A and which coincides with the first half of a positive half-wave of the sine-wave signal A; the method of obtaining a signal of this type will be described hereinafter. Activation of the sampler circuit 8 by the signal B results in sampling of the sine wave A during the corresponding quarter-cycle, thereby generating the signal C; at the end of said quarter-cycle which is devoted to the sampling operation, the sampler 8 is caused to cut-off, which corresponds to the shaded zone of the drive signal B and the output signal C retains the value of the maximum sampled amplitude. When a further square-topped pulse of the drive signal B opens the sampler 8, the signal C reproduces the quarter-cycle of the corresponding signal A and stores the new peak amplitude of this signal.

In order to eliminate discontinuities at the time of return of the signal C to zero, said signal is stored by means of the second storage sampler 10 which is activated by the signal D. This signal is such that said second sampler 10 is activated when the first sampler 8 is cut-off; this presupposes that the drive signal D is inserted during the cut-off periods corresponding to the shaded segments of the signal B. Under these conditions, the signal E which appears at the output of the storage sampler 10 reproduces the peak amplitude of the signal A without any discontinuity.

Figure 4:
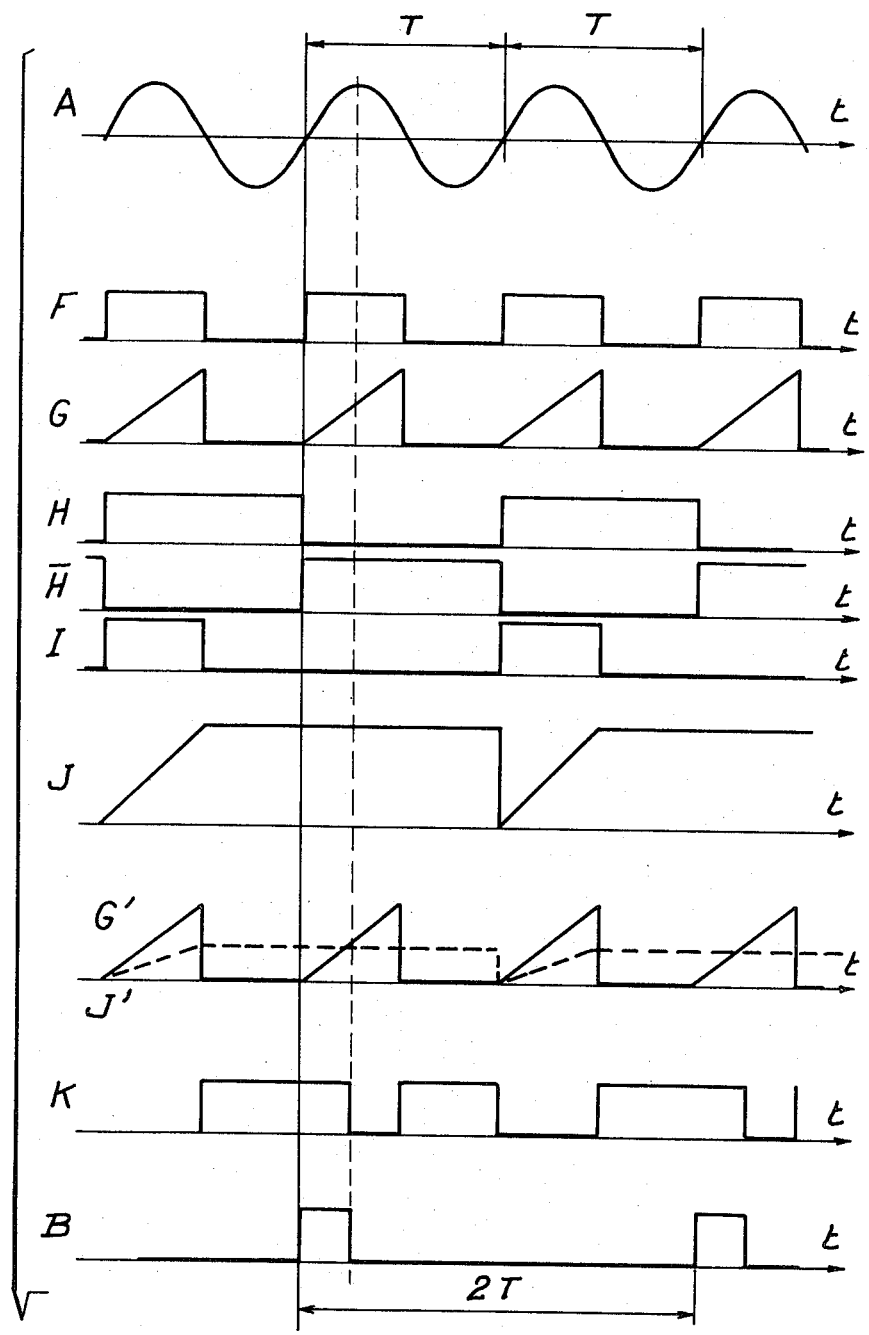
FIG. 4 is a chronogram of the different electrical signals which appear in the first drive-signal generating circuit.

The first circuit for generating the drive signal B which activates the first storage sampler 8 will now be described with reference to FIG. 3. Some of the circuits shown in FIG. 1 again appear in this figure and are designated by the same reference numerals: the impedance matching circuit 4, the first storage sampler 8; the second storage sampler 10 and the circuit 6 for generating the first drive signal B. In order to follow the description of this circuit, reference will be made to the chronogram of FIG. 4 which defines the variation of the different electrical signals appearing at the different points of said circuit.

The sine-wave signal A is shaped by the circuit 20 which delivers at its output a signal F formed of rectangular pulses having the same frequency as the signal A; the signal F triggers a sweep generator 22 which emits the triangular signal G; the frequency of said signal F is divided by two by the frequency divider 24 which generates a rectangular signal H and also the complementary signal $\bar{H}$; a first logic circuit 26 performs the operation F.H, thus generating the signal I; the signal I constitutes a control signal for a storage sampler 28 which additionally receives the signal G and consequently generates at its output a signal J having the shape of trapeziums. A potentiometric circuit formed by the two potentiometers 30 and 32 having ratios k and k/2 converts the signals G and J to proportional signals $G' = kG$ and $J' = k/2\ J$; by way of example, k can assume the value 1/3; the signal G' is applied to the negative input of the two-input comparator circuit 34 and the signal J' is applied to the positive input; said circuit therefore delivers a signal K at its output each time the signal G' exceeds the amplitude of the signal J'. A logic circuit 36 represented in FIG. 3 by an AND-gate performs the operation $F.\bar{H}.K$, thereby generating the drive signal B for activating the sampler 8.

It is apparent that said signal B is generated in each alternate cycle, with the result that the demodulator according to the invention is permitted to follow the progressive variation of the modulus of the input signal with a very short relative time-lag.

The storage sampler 10 must be activated during the cut-off periods of the sampler 8. In order to form the corresponding drive signal D, a number of alternative arrangements are possible and these are illustrated on the one hand in FIG. 3 by the circuits shown in chain-dotted lines and on the other hand in FIG. 5 by means of the chronogram of different signals.

Figure 5:
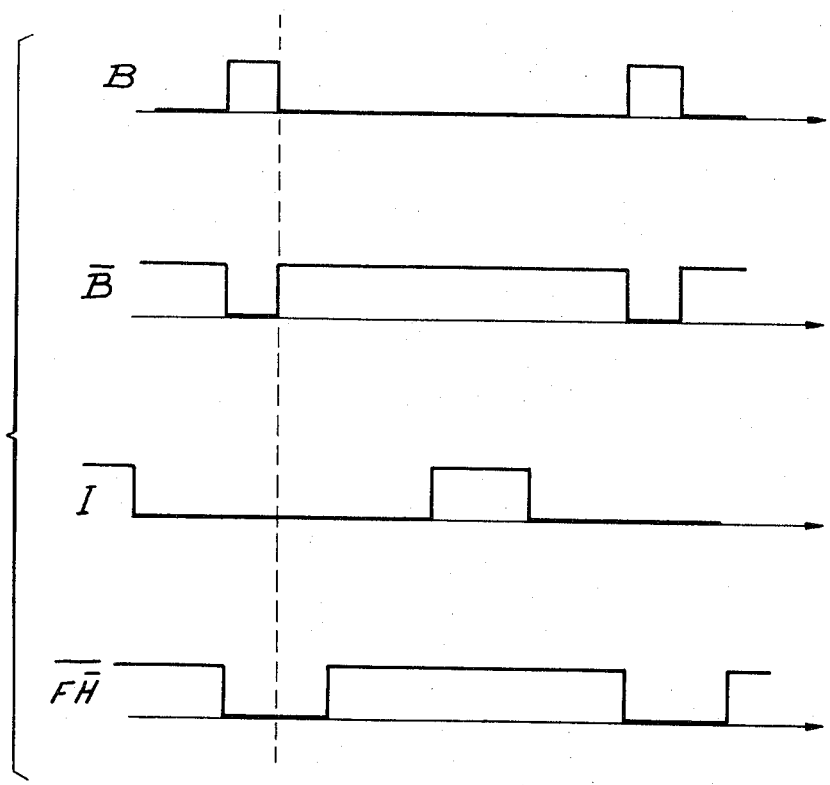
FIg. 5 is a chronogram of the different signals which serve to form the second drive signal for activating the second sampler.

The simplest method of forming the signal D which activates the sampler 10 when the sampler 8 is cut-off consists in making use of the complementary signal of the drive signal B; this is accordingly represented on the second line of FIG. 5 by the signal $\bar{B}$. In this case, the second circuit for generating the drive signal of the sampler 10 is reduced to an inverter 40 which is connected to the output of the first signal-generating circuit 6 and receives the signal B.

In a further alternative arrangement, the drive signal D can be identical with the signal I which is produced within the signal-generating circuit 6 after the logic circuit 26 as represented on the third line of the chronogram of FIG. 5.

Finally, and in accordance with a third alternative arrangement, the signal D can be formed from the signals F and $\bar{H}$ which appear in the circuit 6, after the logical operation $\overline{F.\bar{H}}$ has been performed. In this case, the second circuit for generating the drive signal of the sampler 10 is constituted by a NAND-type logical gate such as the gate 42, the inputs of which are connected to the points of appearance of the signals F and $\bar{H}$.

The logic circuits 26 and 36 which appear in the drive-signal generating circuit can be made up of suitably associated NAND-type logical gates.

It is apparent from the foregoing description that a characteristic feature of the demodulator according to the invention consists in giving the modulus independently of the frequency. In fact, the signals appearing at the two inputs of the comparator 34 follow the same variation of amplitude as a function of the frequency. Thus the sawtooth wave G' increases in amplitude when the frequency decreases and the signal J' follows the peak amplitude of the sawtooth wave G' by a factor of 2.

By way of explanation, the demodulator which has just been described is capable of operating with an input signal having a frequency of 100 kc/s; it accordingly gives the value of the modulus of the signal after two cycles, namely with a time-lag of 20 microseconds.

What we claim is:
1. A sine-wave signal demodulator comprising:
   a first circuit for generating a first drive signal in the form of square-topped pulses each coinciding with the first half of a positive half-wave of said sine-wave signal in each alternate cycle, comprising,
   a shaping circuit which receives the sine-wave signal and delivers a signal F formed of rectangular pulses having the same frequency as the sine-wave signal,
   a sweep waveform generator which is activated by the signal F and emits a signal G,
   a scale-of-two circuit for dividing the frequency of the signal F by two and delivering a signal H as well as its complement $\bar{H}$,
   a first logic circuit which performs the operation F.H,
   a storage sampler which receives the signal resulting from the operation F.H, is activated by the signal G and emits a signal J,
   a first potentiometer of ratio $k$ which converts G to $G' = kG$,
   a second potentiometer of ratio $k/2$ which converts J to $J' = k/2\ J$,
   a two-input comparator circuit which receives the signal G' at its negative input and the signal J' at its positive input and which delivers a signal K,
   a second logic circuit which performs the operation $F.\bar{H}.K$, thus generating said first drive signal,
   a first storage sampler which receives said sine-wave signal and is activated by said first drive signal,
   a second circuit receiving said first drive signal and generating a second drive signal outside the square-topped pulses of said first drive signal, a second storage sampler connected to the output of the first sampler and activated by said second drive signal.

2. A demodulator according to claim 1, wherein said second circuit for producing said second drive signal is constituted by an inverter to which said first drive signal is applied and the two drive signals being in that case complementary.

3. A demodulator according to claim 1, wherein said second drive signal is the signal resulting from the operation F.H which appears after the first logic circuit.

4. A demodulator according to claim 1, wherein said second circuit for producing said second drive signal is constituted by a logic circuit to which the signals F and $\bar{H}$ are applied and which performs the operation F.$\bar{H}$.

5. A demodulator according to claim 1, wherein the logic circuits are constituted by NAND-type logical gates.

6. A demodulator according to claim 1, wherein said first drive signal is generated at each positive half-wave.

* * * * *